US012649301B2

(12) United States Patent
Ventelon et al.

(10) Patent No.: US 12,649,301 B2
(45) Date of Patent: Jun. 9, 2026

(54) VEHICLE DASHBOARD

(71) Applicant: AGC GLASS EUROPE,
Louvain-la-Neuve (BE)

(72) Inventors: Lionel Ventelon, Nivelles (BE); Grazia Laricchiuta, Gosselies (BE)

(73) Assignee: AGC GLASS EUROPE,
Louvain-la-Neuve (BE)

( * ) Notice: Subject to any disclaimer, the term of this patent is extended or adjusted under 35 U.S.C. 154(b) by 127 days.

(21) Appl. No.: 18/578,516

(22) PCT Filed: Jul. 19, 2022

(86) PCT No.: PCT/EP2022/070247
§ 371 (c)(1),
(2) Date: Jan. 11, 2024

(87) PCT Pub. No.: WO2023/006522
PCT Pub. Date: Feb. 2, 2023

(65) Prior Publication Data
US 2024/0308184 A1     Sep. 19, 2024

(30) Foreign Application Priority Data

Jul. 30, 2021     (EP) ..................................... 21188682

(51) Int. Cl.
*B32B 17/10*     (2006.01)
*C03C 15/00*     (2006.01)
(Continued)

(52) U.S. Cl.
CPC .. *B32B 17/10146* (2013.01); *B32B 17/10036* (2013.01); *B32B 17/10449* (2013.01);
(Continued)

(58) Field of Classification Search
CPC ........ B32B 17/10146; B32B 17/10036; B32B 17/10449; B32B 17/10458;
(Continued)

(56) References Cited

U.S. PATENT DOCUMENTS

| | | | | |
|---|---|---|---|---|
| 6,952,312 | B2 * | 10/2005 | Weber | ............... B32B 17/10458 |
| | | | | 359/630 |
| 2009/0303604 | A1 * | 12/2009 | Martin | .............. B32B 17/10174 |
| | | | | 427/163.1 |

(Continued)

FOREIGN PATENT DOCUMENTS

| | | | |
|---|---|---|---|
| EP | 3 144 283 A1 | 3/2017 | |
| WO | WO 2018/013506 A1 | 1/2018 | |

(Continued)

OTHER PUBLICATIONS

WO 2019/170428 A1 (Year: 2019).*
International Search Report Issued Oct. 7, 2022, in PCT/EP2022/070247, filed on Jul. 19, 2022, citing documents 1-8 & 15-18 therein, 4 pages.

*Primary Examiner* — Travis M Figg
(74) *Attorney, Agent, or Firm* — Oblon, McClelland, Maier & Neustadt, L.L.P.

(57)     ABSTRACT

A veiling glare reduction system comprising a glass dashboard part providing increased driver visual comfort, particularly a glass dashboard part arranged so that light passing through the windshield and reflected off the glass dashboard surface is partly reflected by the inner windshield surface towards a driver position providing a reduced veiling glare. A head up display system provided with a glass dashboard part having reduced veiling glare is also provided.

16 Claims, 5 Drawing Sheets

(51) Int. Cl.
    *C03C 23/00*        (2006.01)
    *G02B 27/01*        (2006.01)

(52) U.S. Cl.
    CPC ........ *B32B 17/10458* (2013.01); *C03C 15/00*
        (2013.01); *C03C 23/0055* (2013.01); *G02B*
        *27/0101* (2013.01); *B32B 2250/40* (2013.01);
        *B32B 2255/00* (2013.01); *B32B 2307/406*
        (2013.01); *B32B 2307/414* (2013.01); *B32B*
        *2307/538* (2013.01); *B32B 2605/00* (2013.01);
        *G02B 2027/0118* (2013.01)

(58) Field of Classification Search
    CPC ............ B32B 2250/40; B32B 2255/00; B32B
        2307/406; B32B 2307/414; B32B
        2307/538; B32B 2605/00; C03C 15/00;
        C03C 23/0055; G02B 27/0101; G02B
        2027/0118
    See application file for complete search history.

(56) References Cited

U.S. PATENT DOCUMENTS

| | | | |
|---|---|---|---|
| 2017/0059749 A1 | 3/2017 | Wakatsuki et al. | |
| 2017/0341451 A1* | 11/2017 | Minamidate ...... | B32B 17/10458 |
| 2018/0031743 A1 | 2/2018 | Wakatsuki et al. | |
| 2019/0302533 A1 | 10/2019 | Bhagavatula et al. | |
| 2020/0310113 A1* | 10/2020 | Chang ................... | G02B 1/118 |
| 2020/0393675 A1* | 12/2020 | Huang .............. | G02B 27/0101 |
| 2021/0087106 A1* | 3/2021 | Navet ................... | C03C 15/00 |
| 2021/0132379 A1 | 5/2021 | Dittrich | |

FOREIGN PATENT DOCUMENTS

| | | | | |
|---|---|---|---|---|
| WO | WO 2018/162337 A1 | 9/2018 | | |
| WO | WO-2019165921 A1 * | 9/2019 | ......... | G02B 27/0103 |
| WO | WO-2019170428 A1 * | 9/2019 | ......... | C03C 27/0103 |

* cited by examiner

VEHICLE DASHBOARD

CROSS REFERENCE TO RELATED APPLICATIONS

This application is a National Stage entry under 35 U.S.C. § 371 of PCT/EP2022/070247, filed on Jul. 19, 2022, and claims priority to EP Patent Application No. 21188682.5, filed on Jul. 30, 2021, the entire contents of which are incorporated herein by reference.

FIELD OF THE INVENTION

The present invention relates to a glass dashboard part providing increased driver visual comfort. In particular it relates to a glass dashboard part providing a reduced veiling glare. The present invention may additionally provide better viewing of a head-up display. The present invention further relates to a head up display system provided with a glass dashboard part having reduced veiling glare.

BACKGROUND OF THE INVENTION

Light reflected from a dashboard that reflects off a windshield can interfere with a driver's vision. Referring to FIG. 1, veiling glare in a windshield (103) of a vehicle (100) occurs when ambient light passes through the windshield (105), reflects (106, 107) off the upper surface of dashboard (101), back onto the windshield (106) and reflects (108) off the windshield into the driver's eyes. The driver (104) sees a virtual image of the lit dashboard (101) beyond the windshield (103) that "veils" or impedes the ability to discern the scene ahead of the vehicle. Veiling glare is exacerbated by windshields having a steep slope and light-colored or glossy finished dashboards.

In order to compensate for veiling glare, vehicle manufacturers have been forced to limit the degree of windshield slope, as well as to use non-reflective materials, dark colors and/or a textured surface on the dashboard. These features limit the options for design of vehicles, and the dark colored dashboards absorb radiation resulting in increased heat within the vehicle.

Other systems for reducing veiling glare have focused on the windshield, such as by placing antireflective, holographic or polarizing material on the windshield, which is complicated and expensive to manufacture. Alternately a polarizing coating may be deposited on the dashboard.

US2009097125A1 discloses a method for reducing veiling glare by polarization using a polarizing layer disposed on the vehicle interior surfaces.

SUMMARY OF THE INVENTION

It is an object of the present invention to provide a vehicle glass dashboard part providing reduced veiling glare. The glass dashboard part is positioned so as to reflects light passing through a windshield, the windshield having an inner surface and an outer surface and allowing light to pass therethrough. Less light is reflected back towards the windshield, and then reflected from the windshield inner surface towards the driver.

The present invention's glass dashboard part (201) comprises a glass substrate provided with a first surface (202) that is etched and ion implanted having a surface roughness and comprising implanted ions within a layer (203) within the substrate and adjacent to the etched substrate surface.

The present invention further concerns thus a veiling glare reduction system, for a vehicle (300) having a windshield (303) and a dashboard (302) comprising: a windshield (303), the windshield having an inner surface and an outer surface and allowing light to pass therethrough; a glass dashboard part (201, 301) that reflects the light passing through the windshield; the glass dashboard part (201, 301) comprising a glass substrate provided with a first surface (202), that is etched and ion implanted, having a surface roughness and comprising implanted ions within a layer (203) within the substrate and adjacent to the etched substrate surface such that the reflected light (306, 307) is diffusely reflected of the glass dashboard surface and then reflected (308) by the windshield inner surface. The veiling glare, the part of light that reflects (308) off the windshield into the driver's eyes was found to be reduced with the veiling glare reduction system of the present invention.

For the avoidance of doubt, in the veiling glare reduction system of the present invention, being the purpose of the system, it is implicit that the glass dashboard part and the windshield are arranged so that light passing through the windshield and reflected of the glass dashboard surface is partly reflected by the inner windshield surface towards a driver position, i.e. towards the driver.

The present invention also includes a method of reducing veiling glare in a vehicle having a windshield and a glass dashboard part comprising: passing light through the windshield; allowing the light passing through the windshield to strike the glass dashboard part surface and be reflected by the glass dashboard part surface; and diffusing the light reflected by the glass dashboard part comprising a glass substrate by providing the glass substrate with a first surface that is etched and ion implanted, having a surface roughness and comprising implanted ions within a layer within the substrate and adjacent to the etched substrate surface such that the light is diffusively reflected from the glass dashboard part.

The present invention further includes a head-up display system for a vehicle, comprising:
  a. a windshield (409)
  b. an image source (403) configured to direct light rays (404) corresponding to an image to be formed at the windshield (409),
    characterized in that the image source's light rays pass through a glass dashboard part (401) according to the present invention and in that the glass dashboard part's first surface faces the windshield (409).

DETAILED DESCRIPTION OF THE INVENTION

Figure 1:
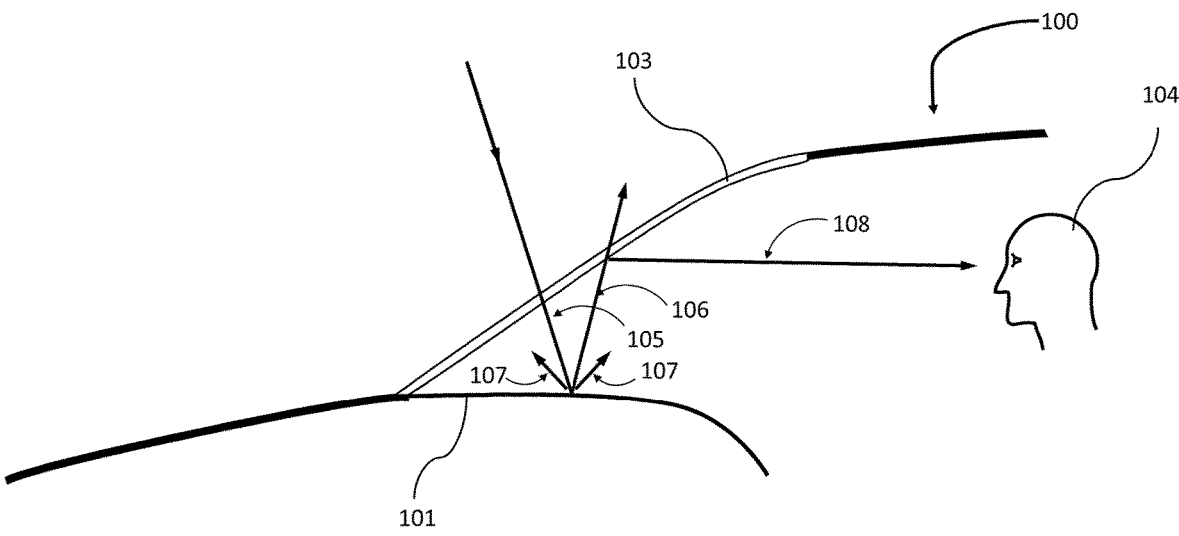
FIG. 1 is a schematic cross-sectional view of a portion of a vehicle having no veiling glare reduction system.
Figure 2:
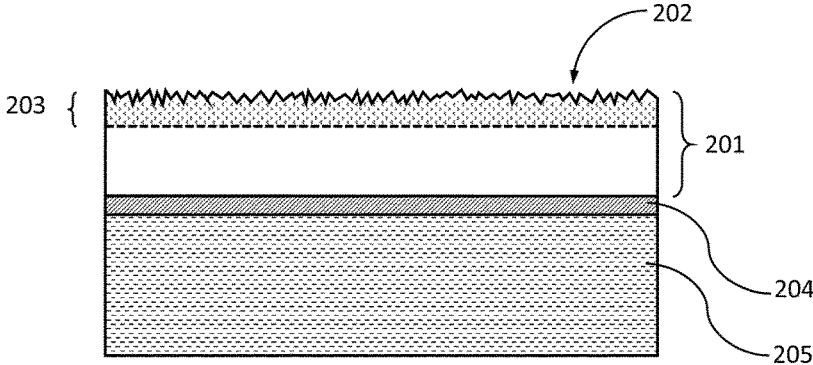
FIG. 2 is a schematic cross sectional view of a dashboard provided with a glass dashboard part according to an embodiment of the present invention.
Figure 3:
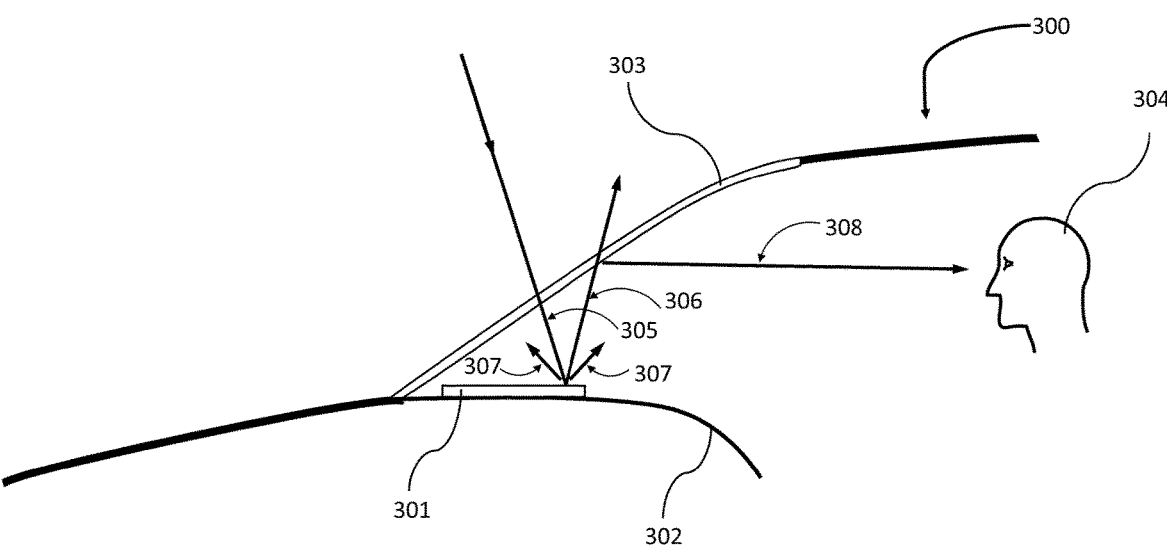
FIG. 3 is a schematic cross-sectional view of a portion of a vehicle having a veiling glare reduction system of the present invention.

According to an embodiment of the present invention, referring to FIG. 3, the glass dashboard part (301), is laminated to a dashboard base structure (302), for example a moulded body made of a low density resin such as polypropylene, expanded polypropylene, polyvinyl chloride, or acrylonitrile/styrene acrylate. Referring to FIG. 2, the glass dashboard part (201) may be transparently laminated to a dashboard structure (205), so that the color of the dashboard structure is visible through the glass dashboard part. The lamination may be performed applying adhesive material (204) on part of the glass part, for example around at least part of the edge of the glass part, or by applying adhesive material to the entire contact area between the glass part and the dashboard structure (205).

Figure 4:
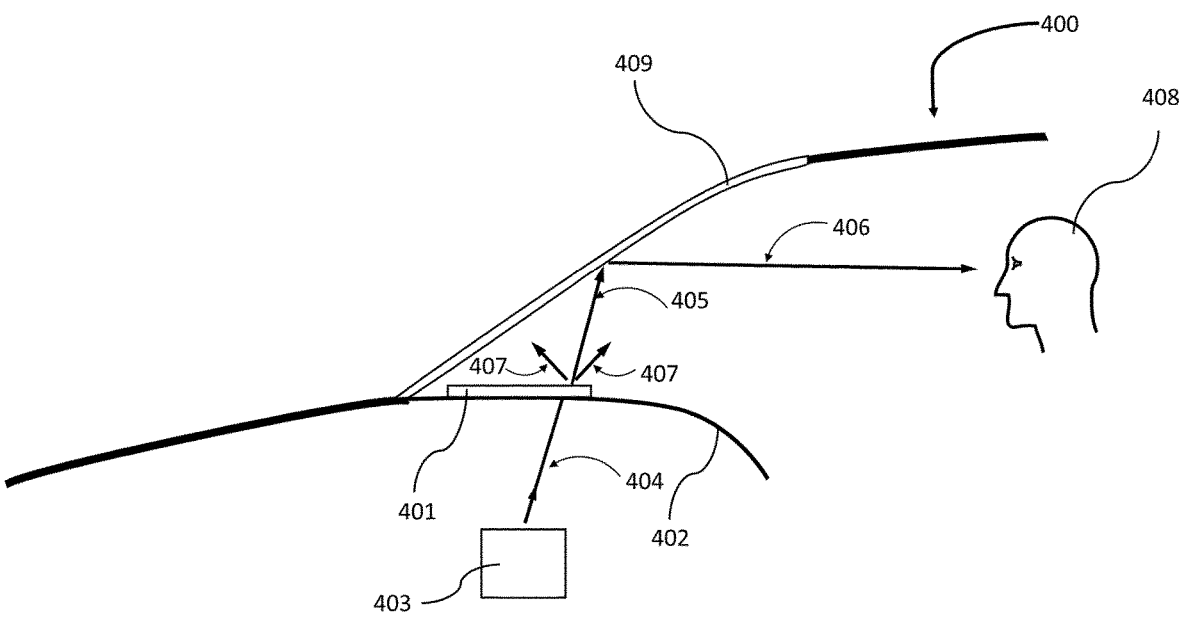
FIG. 4 is a schematic cross-sectional view of a portion of a vehicle having a head-up display system of the present invention.

According to an embodiment of the present invention, referring to FIG. 4, the glass dashboard part (401), is transparently laminated to an image source (403). In certain embodiments the image source may be a head-up display light source.

According to an embodiment of the present invention, the surface roughness of the first surface of the glass substrate of the glass dashboard part, is defined, when measured on an evaluation length of 12 mm and with a Gaussian filter of which the cut-off wavelength is 0.8 mm, by:

a. $0.02 \ \mu m \leq Ra \leq 0.60 \ \mu m$,
 b. $0.1 \ \mu m \leq Rz \leq 3.0 \ \mu m$ and
 c. $0.01 \ \mu m \leq RSm \leq 0.08 \ \mu m$, said glass substrate advantageously may have the following optical properties, when measured from said first surface, with the opposite surface exposed to air:

a haze value of from 1 to 85%,
 a clarity value of from 10 to 100%,
 a gloss value at 60° of from 10 to 50 SGU, and
 a visible light reflectance of from 7 to 4.5%, about 4% thereof is the reflectance from the air/substrate interface opposite the first surface.

According to an advantageous embodiment of the present invention, the glass substrate of the glass dashboard part, have preferably low sparkle values of less than 10%, in particular less 7%, in particular less than 5%, when measured following the method detailed below together with the examples part of the specification.

The optical properties of the preceding two paragraphs may be obtained in the absence of any coating or surface treatment on the second surface, that is the surface opposite to the first surface.

Throughout the present text, when a numerical range is indicated, the limits of the range are considered to be included in the range. In addition, all the integral and subdomain values in the numerical range are expressly included as if explicitly written.

By "etched surface", it is meant a surface which has been attacked by a mechanical or chemical way, removing a certain amount of glass material and giving a specific surface texture/roughness. In chemically-etched glass, material removal occurs by chemical reactions/attack (i.e. acid etching). In mechanically-etched glass, material removal occurs by mechanical reactions/attack (i.e. sandblasting).

Alternately, laser texturing may be used to provide an "etched surface". According to the invention, said at the glass substrate may be etched advantageously over substantially the entire glass surface, that-is-to-say over at least 90% of the glass surface.

In one embodiment, chemical etching is used to etch the glass surface. A variety of methods may be used to chemically etch a glass substrate for a dashboard part and create the surface roughness. In one embodiment of the present invention a fluoride based solvent may be used to create the rough surface. For example, an aqueous solution of ammonium bifluoride ($NH_4F$—HF) may be used, comprising for example 15 to 35 wt % $NH_4$—HF, the rest being $H_2O$. The surface to be etched is brough into contact with the etchant solution for a set time. Time and concentration are adjusted so as to obtain the sought surface roughness.

By first surface that is etched and ion implanted, it is meant that after etching, the etched surface has been submitted to ion implantation so as to lower the glass dashboard part's visible light reflectance and now comprises ions that are implanted in a layer proximate the first surface of the substrate. As is well known in the art, the ion implantation process is different from the ion exchange process of chemical strengthening, also regarding the resulting glass substrate.

A etched surface of a glass dashboard part is usually characterized by its surface texture or roughness, and in particular, by the Ra, Rz and Rsm values (expressed in μm) defined in the standard ISO 4287-1997. The texture/roughness is a consequence of the existence of surface irregularities/patterns. These irregularities consist of bumps called "peaks" and cavities called "valleys". On a section perpendicular to the etched surface, the peaks and valleys are distributed on either side of a "center line" (algebraic average) also called "mean line". In a profile and for a measurement along a fixed length (called "evaluation length"):

a. Ra (amplitude value) corresponds to the average difference of texture, that is, means the arithmetic average of absolute values of differences between the peaks and valleys. Ra measure the distance between this average and the "line" and gives an indication of the height of the patterns on the first surface that is etched and ion implanted;
 b. Rz (amplitude value) corresponds the "ten-point mean roughness" and is the sum of the average peak among 5 tallest peaks and the average valley between 5 lowest valleys.
 c. RSm (spacing value, sometimes also called Sm) is the average distance between two successive passages of the profile through the "mean line"; and this gives the average distance between the "peaks" and therefore the average value of the widths of the patterns.

The roughness values according to the invention may be measured with a profilometer using 2D profiles (according to the ISO4287 standard). Alternatively, one can use the technique of 3D profilometry (according to the ISO 25178 standard) but isolating a 2D profile which then gives access to the parameters defined in the ISO4287 standard.

According to an embodiment of the invention, the roughness values are measured with a Gaussian filter, which is a filter of long wavelengths, also called profile filter λc. It is used for separating the components of roughness/texture from components of undulation of the profile.

The evaluation length L according to the invention is the length of the profile used to evaluate the roughness. Base length, I is the part of the evaluation length used to identify irregularities characterizing the profile to assess. The evaluation length L is divided/cut into n base lengths I which depend on the profile irregularities. The base length I corresponds to the "cut-off" wavelength (or limit wavelength) of the Gaussian filter (I=λc). Typically, the evaluation length is of at least five times the base length.

In roughness measurements, a short wavelength filter (profile filter λs) is also commonly used to eliminate the effects of very short wavelengths which are background noise.

The visible light reflectance Rc is measured on the first surface that is etched and ion implanted (or side) of the glass dashboard part using illuminant D65 and a 2° observer angle. The surface opposite the first surface is exposed to air for the purpose of this measurement. The color in reflection is expressed using CIELAB color coordinates a* and b* under illuminant D65 using 10° observer angle and is measured on the etched and ion implanted side of the glass dashboard part. CIE L*a*b* or CIELAB is a color space specified by the International Commission on Illumination and is routinely used in glass industry among others. Unless specified otherwise, the visible light reflectance Rc, and the colors in reflection a*Rc, b*Rc are measured at an angle of 8°, close to perpendicular to the glass dashboard part surface. Values measured at other angles are identified by specifying the measurement angle within brackets, i.e. for a measurement angle of 35°: Rc (35°), a*Rc (35°), b*Rc (35°). The transmittance TL is measured also using illuminant D65 and a 2° observer angle.

According to one embodiment of the invention, the surface roughness of the first surface that is etched and ion implanted of the invention is such that: 0.010 μm≤RSm≤0.060 μm. Advantageously, the surface roughness of the first surface that is etched and ion implanted of the invention is such as: 0.015 μm≤RSm≤0.06 μm. Lower RSm roughness values, possibly in combination with certain haze and gloss values, provide the glass dashboard part of the invention with lower sparkle values, which is of interest when an image is projected through the glass such as in head-up display system.

According to another advantageous embodiment of the invention, the surface roughness of the first surface that is etched and ion implanted of the invention is such as: 0.02 μm≤Ra≤0.60 μm. Alternatively, the surface roughness of the first surface that is etched and ion implanted of the invention is such as: 0.05 μm≤Ra≤0.40 μm or even 0.14 μm≤Ra≤0.40 μm. Lower values of Ra provide the glass dashboard part of the invention a lower haze value.

According to another advantageous embodiment of the invention, the surface roughness of the first surface that is etched and ion implanted of the invention is such as: 0.10 μm≤Rz≤3.00 μm, or 0.50 μm≤Rz≤3.00 μm, or even 0.75 μm≤Rz≤3.00 μm.

The glass dashboard part of the present invention may comprise ions, preferably selected from positively charged ions of O, N, He, Ne, Ar, or Kr proximate the first surface of the glass substrate. The implanted ions are preferably present proximate the first surface up to a depth comprised between 0.1 μm and 1 μm. The amount of implanted ions is preferably comprised between $5\times10^{14}$ ions/cm² and $10^{18}$ ions/cm², advantageously between $10^{16}$ ions/cm² and $5\times10^{17}$ ions/cm², more advantageously between $3\times10^{16}$ ions/cm² and $10^{17}$ ions/cm².

The ion implantation comprises the implantation of positively charged ions of O, N, He, Ne, Ar, or Kr so as to reduce the visible light reflectance of the etched glass dashboard part.

According to the present invention the implantation step comprises the following operations:

a. providing a source gas selected from $O_2$ or $N_2$, He, Ne, Ar, or Kr.

b. ionizing the source gas so as to form positively charged ions of O, N, He, Ne, Ar, or Kr, c. accelerating the positively charged ions of O, N, He, Ne, Ar, or Kr with an acceleration voltage comprised between 5 kV and 100 kV, d. providing a glass dashboard part with an etched first surface, e. positioning the glass dashboard part in the trajectory of the beam of positively charged ions of O, N, He, Ne, Ar, or Kr with the etched surface facing the beam and thereby implanting ions from the selected source gas into the glass dashboard part's etched first surface.

In an embodiment of the present invention the trajectory of the ion beam is essentially perpendicular to the etched surface of the glass dashboard part.

The ion dosage, or dose, is preferably comprises between $5\times10^{14}$ ions/cm² and $10^{18}$ ions/cm², advantageously between $10^{16}$ ions/cm² and $5\times10^{17}$ ions/cm², more advantageously between $3\times10^{16}$ ions/cm² and $10^{17}$ ions/cm². The ion dosage may for example be controlled by the duration of exposure to the ion beam and also depends on the fluence of the beam.

In certain embodiments the glass dashboard part is moved relative to the ion beam in order to treat its entire surface in a single pass or in multiple passes. The glass dashboard part may be moved at speeds comprised between 20 and 160 mm/s.

The etched glass dashboard part shows after ion implantation a visible light reflectance of at most 7% and most surprisingly, despite the roughness of the first surface that is etched and ion implanted shows no visible non-uniformities and despite the ion implantation taking place at a non-perpendicular angle to the surface structures. Additionally the etched glass dashboard part may show after ion implantation small angular reflected color variations. In particular the etched glass dashboard part may also show after ion implantation a neutral color in reflection or a blue color in reflection.

The inventors have found that advantageously ion sources providing an ion beam comprising a mixture of single charge and multicharge ions are used to ionize the source gas. Such ion mixtures, accelerated with the same acceleration voltage are particularly useful as they may provide higher fluences than single charge ion beams. They are therefore able to reach a certain dosage in a shorter amount of time. Multiple charge ions are also interesting because they reach greater implantation depths than single charge ions, for the same acceleration voltage. The implantation energy, expressed in Electron Volt (eV) is calculated by multiplying the charge of the single charge ion or multicharge ion with the acceleration voltage. An ion beam comprising a mixture of single charged ions and multi charged ions are particularly useful as for a certain acceleration voltage, a double charged ion of a certain species, for example N2+, will have double the implantation energy of the corresponding single charge ion, N+. Thereby greater implantation depths can be reached without having to increase the acceleration voltage. According to an advantageous embodiment of the present invention the positively charged ions comprise a mixture of single and/or multiple charged ions. As for a given acceleration voltage, ions are provided with an energy proportional to their charge, a mixture of single charge and multiple charged ions enables the implantation over a wider depth range in a single step than with single charge ions. More advantageously, in a mixture of single and multiple charged ions the relative amounts of the differently charged ions decreases with increasing charges. Thereby the amount of implanted ions decreases when going from the substrate surface towards the bulk, together with a gradual variation of physical properties.

In an embodiment of the present invention the ion beam at least 90% of the ions in the ion beam are made up of the single charge and double charge ions of a species selected from N, O, He, Ne, Ar, Kr and the ratio of single charge species and double charge species is at least 55/25. The respective single charge and double charge species are $N^+$ and $N^{2+}$, $O^+$ and $O^{2+}$, $He^+$ and $He^{2+}$, $Ne^+$ and $Ne^{2+}$, $Ar^e$ and $Ar^{2+}$.

In an alternate embodiment ions are implanted by implanting sequentially the selected ions as monocharged ions, for example in several steps of differing acceleration voltages.

In a preferred embodiment of the present invention the temperature of the area of the glass substrate being treated, situated under the area being treated is less than or equal to the glass transition temperature of the glass substrate. This temperature is for example influenced by the ion current of the beam, by the residence time of the treated area in the beam and by any cooling means of the substrate.

In an advantageous embodiment of the invention implanted ions of either N or O are used as they show less substrate surface sputtering than heavier ions, which is particularly important to maintain the surface roughness obtained by etching. In another embodiment of the invention implanted ions of N and O are combined.

In another advantageous embodiment of the invention implanted ions of either Ar are used as similar performance as with implantation of N ions can be reached with lower dosage.

In one embodiment of the invention several ion implantation beams are used simultaneously or consecutively to treat the glass substrate.

In one embodiment of the invention the total dosage of ions per surface unit of an area of the glass substrate is obtained by a single treatment by an ion implantation beam.

In another embodiment of the invention the total dosage of ions per surface unit of an area of the glass substrate is obtained by several consecutive treatments by one or more ion implantation beams. The ion beams may use the same or different source gases to implant the same or different ions of O, N, He, Ne, Ar, or Kr.

The method of the present invention is preferably performed in a vacuum chamber at a pressure comprised between $10^{-2}$ mbar and $10^{-7}$ mbar, more preferably at a pressure comprised between $5 \times 10^{-5}$ mbar and $6 \times 10^{-6}$ mbar.

An example ion source for carrying out the method of the present invention is the Hardion+ RCE ion source from Ionics SA.

The present invention also concerns the use of a mixture of single charge and multicharge ions of O, N, He, Ne, Ar, or Kr to decrease veiling glare, the mixture of single charge and multicharge ions being implanted in the glass substrate with an ion dosage and acceleration voltage effective to reduce the veiling glare.

Advantageously the implantation depth of the ions may be comprised between 0.1 μm and 1 μm, preferably between 0.1 μm and 0.5 μm. The implanted ions are spread between the substrate surface and the implantation depth. The implantation depth may be adapted by the choice of implanted ion, by the acceleration energy and varies to a certain degree depending on the substrate.

According to the present invention, the mixture of single charge and multicharge ions of O or N preferably comprises, $O^+$ and $O^{2+}$ or $N^+$, $N^{2+}$ and $N^{3+}$ or $Ar^+$ and $Ar^{2+}$ respectively.

According to a preferred embodiment of the present invention, mixture of single charge and multicharge ions of O comprises a lesser amount of $O^{2+}$ than of $O^+$. In a more preferred embodiment of the present invention the mixture of single charge and multicharge ions of O comprises 55 to 98% of $O^+$ and, 2 to 45% of $O^{2+}$.

According to another preferred embodiment of the present invention, mixture of single charge and multicharge ions of N comprises a lesser amount of $N^{3+}$ than of $N^+$ and of $N^{2+}$ each. In a more preferred embodiment of the present invention the mixture of single charge and multicharge ions of N comprises 40 to 70% of $N^+$, 20 to 40% of $N^{2+}$, and 2 to 20% of $N^{3+}$.

According to another preferred embodiment of the present invention, mixture of single charge and multicharge ions of Ar comprises a lesser amount of $Ar^{2+}$ than of $Ar^+$. In a more preferred embodiment of the present invention the mixture of single charge and multicharge ions of N comprises 50 to 80% of $Ar^+$, 10 to 30% of $Ar^{2+}$, and 3 to 15% of $Ar^{3+}$.

In an embodiment of the invention the ion implantation results in a reduction of the veiling glare.

Referring to FIG. 3, the present invention is directed to a veiling glare reduction system for use in a vehicle (300). By vehicle, it is meant a passenger vehicle, truck, train, airplane, watercraft or the like, having a sloped windshield and a dashboard. The windshield (303) of a conventional vehicle (300) is typically produced from glass or plastic.

Light incident on the windshield (303) will be transmitted (305) or absorbed or reflected (not shown), depending on the properties of the windshield (303), such as the refractive index of the windshield material and the chemical composition of the windshield (303), as well as the angle of incidence of the light.

The light (305) passing through the windshield (303) strikes the first surface that is etched and ion implanted of a glass dashboard part of the present invention (301) positioned on an interior surface of the vehicle, such as the dashboard (302). The light (306, 307) reflected by the dashboard (302) is reflected, in part diffusely (307), in part in an essentially specular manner (306). Due to the etched and ion implanted substrate surface the amount of reflected light of this surface alone is greatly reduced. Thereby the amount of reflected light that reaches the driver is further reduced, this effect is further enhanced by the diffusiveness of the reflected light.

In one embodiment, the glass dashboard part (301) may be transparently laminated to a dashboard structure (302), so that the color of the dashboard structure is visible through the glass dashboard part. Advantageously, the dashboard structure is light absorbing and/or colored, thereby further reducing the amount of light reflected of its surface where it is in contact with the adhesive used for lamination. Due to the glass dashboard part of the present invention, the aspect, for example color, of the dashboard structure is not altered or perturbed. In contrast with traditional multilayer antireflective coatings there are no noticeable changes of transmitted or reflected color, even at high viewing angles, for example at up to 60° with the glass dashboard part of our invention. The adhesive material preferably has a refractive index n(adhesive) in the visible wavelength range close to the refractive index n(glass) of the bulk of the glass dashboard part. The lower the difference the less light reflection at the glass-adhesive interface. Preferably 0.8×n(glass)≤n (adhesive)≤1.2×n(glass), more preferably 0.9×n(glass)≤n (adhesive)≤1.1×n(glass).

There are thus several benefits of the veiling glare reduction system of the present invention. The system provides improved visual acuity by avoiding or minimizing veiling glare, and it may be used with dashboards that are lighter colored than previously available, such as having a light grey or beige color. In addition, the absence of any coating on the exposed surface of the glass dashboard part makes it more resistant both chemically and mechanically and aesthetically more pleasing.

While the preferred embodiments of the present invention are described above, obvious modifications and alterations of the present invention may be made without departing from the spirit and scope of the present invention. The scope of the present invention is defined by the appended claims and equivalents thereto.

Color variations, for example after an angular variation, $\Delta a^*b^*$ are defined as follows relative to a reference point before the respective variation: $\Delta a^*b^* = [(a^*(after) - a^*(before))^2 + (b^*(after) - b^*(before))^2]^{1/2}$. Other variations may be considered, such as before/after lamination.

In an embodiment of the present invention the glass dashboard part, when laminated to a dashboard structure, does not significantly modify the color of the laminated dashboard structure viewed through the dashboard part. Advantageously, $\Delta a^*b^*Rc$ (db, lam), the variation of reflected color of the dashboard structure before lamination $a^*Rc(db)$ and $b^*Rc(db)$ and reflected color of the dashboard structure after lamination, and viewed through the glass dashboard part, $a^*Rc(db, after\ lam.)$ and $b^*Rc(db, after\ lam.)$ is such that, $\Delta a^*b^*Rc$ (db, lam)≤1.5, or a an angular color variation $\Delta a^*b^*Rc$ (db, lam)≤1, or an angular color variation $\Delta a^*b^*Rc$ (db, lam)≤0.7, or a particularly low angular color variation $\Delta a^*b^*Rc$ (db, lam)≤0.5.

In an embodiment of the present invention the glass dashboard part provides a low angular color variation when laminated to a dashboard structure. This means that the color of the dashboard structure does not vary when viewed through the glass dashboard glass at an angle. In particular the angular color variation $\Delta a^*b^*Rc$ at a viewing angle of 35° is such that $\Delta a^*b^*Rc$ (35°)≤1.5, or a an angular color variation $\Delta a^*b^*Rc$ (35°)≤1, or an angular color variation $\Delta a^*b^*Rc$ (35°)≤0.7, or sa particularly low angular color variation $\Delta a^*b^*Rc$ (35°)≤0.5. In certain embodiments $\Delta a^*b^*Rc$ values of at most 3, at most 2 and even at most 1 are obtained for any one or more angle of observation up to 75°.

In an embodiment of the invention the glass dashboard part provides a neutral color of the reflected light when measured in air, without a laminated dashboard structure. In particular the CIELAB color coordinates of the reflected light on the etched and ion implanted side of the glass substrate are, expressed by the color coordinates of $a^*Rc$ and $b^*Rc$ in reflection, is neutral, that is $1 \le a^*Rc \le 1$ and $1 \le b^*Rc \le 1$, or is more neutral, that is $0.5 \le a^*Rc \le 0.5$ and $0.5 \le b^*Rc \le 0.5$, or even is very neutral, that is $0.3 \le a^*Rc \le 0.3$ and $0.3 \le b^*Rc \le 0.3$. In some cases it is sufficiently neutral to have a color in reflection that is $2 \le a^*Rc \le 2$ and $2 \le b^*Rc \le 2$.

The glass dashboard according to the invention shows excellent low sparkle properties together with the reduced veiling glare in a windshield equipped vehicle.

"Sparkle" refers to small bright spots (approximately at the pixel-level size scale) that appear in the instant texture of an image of an image source an etched glass surface and which gives to the transmitted image a grainy appearance. The "sparkling effect" is thus an optical interaction between two surface areas: the regular display pixel matrix (light source) and the etched glass surface with less regular microstructures. It appears as a random fluctuation in intensity on a display (involving refraction, diffraction, diffusion phenomena) as the viewer's head moves from side-to-side. In the present setting this is important when light from n image source, for example a head-up display light source, in particular for image sources of high resolution for example of more than 150 dots per inch (dpi), or more than 250 dpi.

The optical properties of the glass dashboard part according to the invention may be characterized by:

a. the direct total light transmission (or specular light transmission) TL;

b. the diffuse light transmission, measured through (i) the "haze" and (ii) the "clarity": the "haze" corresponds to the diffuse transmittance at wide angles scattering while the "clarity" corresponds to the diffuse transmittance at narrow angles scattering; and c. the gloss, characterizing, for example, the brightness or shine of a surface, and more particularly corresponding to the specular reflectance of a surface relative to a standard (such as, for example, a certified black glass standard) in accordance with ASTM standard D523 at a specific angle, and it is expressed in SGU (standard gloss units).

All optical properties, unless otherwise mentioned, are measured on an etched and ion implanted glass dashboard part of the present invention without any additional coating or surface treatment on the surface opposite the first surface that is etched and ion implanted and without lamination to a dashboard structure.

The term "diffuse" used for the light transmission is the proportion of light which, when passing through the glass, is deflected from the incident beam by dispersion of more than 2.5°. The term "diffuse" used for the light reflection is the proportion of light which, by reflection at the glass/air interface, is deflected from the specularly reflected beam by dispersion of more than 2.5°.

The optical properties of the glass dashboard part are measured in the present invention from the first surface that is etched and ion implanted.

According to an advantageous embodiment of the invention, and depending on the chosen application, the glass dashboard part has a haze of from 1 to 40%. More preferably, the glass dashboard part has a haze of from 1 to 35%.

According to another advantageous embodiment of the invention, the glass dashboard part has a clarity of from 20 to 100%. According to another advantageous embodiment of the invention, the glass dashboard part has a clarity of from 40 to 80%.

According to an advantageous embodiment of the invention, the glass dashboard part has a gloss value at 60° of from 10 to 40 SGU. According to an advantageous embodiment of the invention, the glass dashboard part has a gloss value at 60° of from 20 to 35 SGU.

According to an advantageous embodiment of the invention the glass dashboard part have a surface roughness defined as measured on an evaluation length of 12 mm and with a Gaussian filter of which the cut-off wavelength is 0.8 mm, by:

0.05 μm≤Ra≤0.4 μm, preferably 0.14 μm≤Ra≤0.4 μm, 0.010 μm≤RSm≤0.060 μm, preferably 0.015 μm≤RSm≤0.060 μm, said glass dashboard part advantageously may have the following optical properties, when measured from said first surface that is etched and ion implanted:

a haze value of from 1 to 40%, preferably from 1 to 35%;

a clarity value of from 20 to 100%, preferably from 40 to 80%;

a gloss value at 60° of from 10 to 40 SGU, preferably from 20 to 35 SGU.

To quantify the glass transmission in the visible range, we define light transmission (TL) calculated between the wavelengths of 380 and 780 nm according to the ISO9050 standard and measured with the D65 illuminant such as defined by ISO/CIE 10526 standard by considering the standard colorimetric observer CIE 1931 as defined by the ISO/CIE 10527 standard under a solid viewing angle of 2°. The glass dashboard part according to the invention preferably has a light transmission TL of at least 85%, preferably at least 90%.

The glass dashboard part according to the invention is made of glass whose matrix composition is not particularly limited and may thus belongs to different glass categories. The glass may be a soda-lime-silicate glass, an aluminosilicate glass, an alkali-free glass, a boro-silicate glass, etc. Preferably, the glass dashboard part of the invention is made of a soda-lime glass or an alumino-silicate glass.

According to an embodiment of the invention, the glass dashboard part has a composition comprising, in a content expressed in percentages of the total weight of the glass, indicated in Table 1 below.

TABLE 1

|  | Composition | Preferred composition | More preferred composition |
|---|---|---|---|
| SiO2 | 55-85% | 55-78% | 65-78% |
| Al2O3 | 0-30% | 0-18% | 0-6% |
| B2O3 | 0-20% | 0-18% | 0-4% |
| Na2O | 0-25% | 5-20% | 5-20% |
| CaO | 0-20% | 0-10% | 0-10% |
| MgO | 0-15% | 0-10% | 0-10% |
| K2O | 0-20% | 0-10% | 0-10% |
| BaO | 0-20%. | 0-5%. | 0-5%. |

Such a soda-lime-type base glass composition has the advantages to be inexpensive even if it is less mechanically resistant as such. Ideally, according to this last embodiment, the glass composition does not comprise B2O3 (meaning that it is not intentionally added, but could be present as undesired impurities in very low amounts).

In an alternative more preferred manner, the glass dashboard part has a composition comprising, in a content expressed in percentages of the total weight of the glass: SiO2 55-70%; Al2O3 6-18%; B2O3 0-4%; CaO 0-10%; MgO 0-10%; Na2O 5-20%; K2O 0-10% BaO 0-5%.

Such an alumino-silicate-type base glass composition has the advantages to be more mechanically resistant but it is more expensive than soda-lime glass. Ideally, according to this last embodiment, the glass composition does not comprise B2O3 (meaning that it is not intentionally added, but could be present as undesired impurities in very low amounts).

According to an advantageous embodiment of the invention, combinable with previous embodiments on base glass composition, the glass dashboard part has a composition comprising a total iron (expressed in terms of Fe2O3) content ranging from 0.002 to 0.06 weight %. A total iron (expressed in the form of Fe2O3) content of less than or equal to 0.06 weight % makes it possible to obtain a glass dashboard part with almost no visible coloration and allowing a high degree of flexibility in aesthetic designs. The minimum value makes it possible not to be excessively damaging to the cost of the glass as such, low iron values often require expensive, very pure, starting materials and also purification of these. Preferably, the composition comprises a total iron (expressed in the form of Fe2O3) content ranging from 0.002 to 0.04 weight %. More preferably, the composition comprises a total iron (expressed in the form of Fe2O3) content ranging from 0.002 to 0.02 weight %. In the most preferred embodiment, the composition comprises a total iron (expressed in the form of Fe2O3) content ranging from 0.002 to 0.015 weight %.

According to a preferred embodiment, the glass dashboard part of the invention is a float glass sheet. The term "float glass sheet" is understood to mean a glass sheet formed by the float process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin). Therefore, a float glass sheet can be easily distinguished from sheets obtained by other glassmaking processes, in particular by the tin oxide content which may be measured, for example, by electronic microprobe to a depth of ~10 µm.

According to another preferred embodiment, the glass dashboard part of the invention is a glass sheet formed by a slot draw process or by a fusion process, in particular the overflow downdraw fusion process. These processes, in particular the fusion process produces glass sheets whose surfaces may reach superior flatness and smoothness necessary in some applications, but they are also more expensive than the float process for large scale glass production.

The glass dashboard part according to the invention may have a thickness of from 0.1 to 25 mm. Advantageously, the glass dashboard part according to the invention has a thickness of from 0.1 to 6 mm. More advantageously, in particular if the dashboard shape requires bending, the thickness of the glass dashboard part according to the invention is of from 0.1 to 2.2 mm.

The invention also relates to a glass dashboard part which is chemically strengthened/tempered or thermally tempered. All previously described embodiments also apply to the invention of chemically strengthened/tempered or thermally tempered glass dashboard part.

According to an embodiment, the present invention relates to a head-up display system for a vehicle, comprising: A glass dashboard part of the present invention, and a windshield including first and second substantially parallel spaced-apart substrates sandwiching a polymer-inclusive interlayer; and an image source configured to direct light rays corresponding to an image to be formed at the windshield, the light rays being directed towards the windshield through the glass dashboard part, wherein the first surface of the glass dashboard faces the windshield and is etched and ion implanted and wherein the second surface, opposing the first surface faces the image source. The glass dashboard part may comprise any of the embodiments above or any possible combination of embodiments above.

In an embodiment, the head-up display system of the present invention comprises an image source directing light rays towards the windshield which are p-polarized.

In an embodiment, in the head-up display system of the present invention, the windshield further comprises a low-E coating.

In an embodiment, in the head-up display system of the present invention, the windshield comprises a coating selectively reflecting p-polarized light on the at least part of a surface facing the glass dashboard part.

EXAMPLES

Reference example R1 is a flat glass sheet that is chemically etched on one major surface and that was prepared according to the method disclosed in EP3166900 A1 and incorporated by reference herein. R1 is prepared from clear soda-lime float glass of 1.1 mm thickness respectively.

The samples 1 and 2 according to the present invention were prepared, starting from reference example R1 according to the various parameters detailed in the tables below using an RCE ion source for generating a beam of single charge and multicharge ions of N. The ion source used was a Hardion+ RCE ion source from Ionics SA.

All samples had a size of between 26×56 cm$^2$ and 56×56 cm$^2$ and were treated on the entire etched surface by displacing the glass substrate through the ion beam at a speed between 20 and 80 mm/s.

The temperature of the area of the glass substrate being treated was kept at a temperature less than or equal to the glass transition temperature of the glass substrate.

For all examples the implantation was performed in a vacuum chamber at a pressure of $10^{-6}$ mbar.

TABLE 1

| Sample | Reference glass | Acceleration Voltage (kV) | Dose (ions/cm$^2$) |
|---|---|---|---|
| 1 | R1 | 22.5 | $8 \times 10^{16}$ |
| 2 | R2 | 20 | $7 \times 10^{16}$ |

Comparative Example C1 can be prepared on R1 by depositing by magnetron sputtering the following layer sequence, the thicknesses in parentheses, Glass/TiO$_x$(13 nm)/SiO$_2$ (39 nm)/Nb$_2$O$_3$ (110 nm)/SiO$_2$ (65 nm)/Ti$_{65}$Zr$_{35}$O$_x$ (6 nm). This is a four layer antireflective coating with protective overcoat. Without significantly altering the comparative results, TiO$_x$ and Nb$_2$O$_3$ may be used interchangeably and the Ti$_{65}$Zr$_{35}$O$_x$ layer may be omitted as it is used mostly for mechanical resistance purposes, not for an optical contribution.

Each of the glass dashboard parts were analyzed in terms of texture/surface roughness and optical properties.

Surface roughness measurements were performed using a 3D optical profiler Leica Type DCM3D, using the "Leica map" software, on an evaluation length of 12 mm and with a Gaussian filter of which the cut-off wavelength is 0.8 mm. The sample is first cleaned with detergent and dried. It is then placed under the microscope and after conventional settings, the profile of a 2D acquisition is then initiated (the software applies a default cut-off wavelength λs of 2.5 μm).

Haze and clarity measurements were performed according to ASTM standard D1003-11 with illuminant A2.

Gloss measurements were performed according to ASTM standard D523-14 at a specific angle of 60°, using a certified black glass standard with a gloss at 60° of 96.0.

Sparkle is the result of the interaction between two structured layers: the pixel matrix of the display and the random surface structures of the etched surface. Measuring the sparkle effect is made according to the method disclosed by the company "Display-Messtechnik & Systeme", using the apparatus SMS-1000. For evaluation of the sparkle intensity modulation caused by the pixel matrix of the display have to be separated from random intensity modulations from sparkling. Numerical image of the display glass surface is recorded for two different exposures corresponding to limited translation. A difference image is created. The level of sparkle is evaluated by dividing the standard deviation of a selected region in the sparkling area by the mean value of the same region of one of the original images.

The conditions selected to operate are:
pixel ratio 264 (distance from the screen 40 cm)
1 filter
intensity 240

For sparkle measurement each sample is placed on an Apple iPad4 retina display showing a green background image, with its antireflective, etched surface directed towards the camera.

Transmittance and reflectance measurements were performed using an UltraScan PRO Spectrophotometer from Hunter Associates Laboratory, Inc. Colors in reflection were measured using a Perkin Elmer Lambda 950 spectrophotometer with an ARTA accessory for angular resolved reflectance measurements.

Table 2 below, shows the roughness of the reference sample. Roughness values stay essentially the same after implantation of examples 1 and 2.

TABLE 2

| Example | Ref. glass | Ra (μm) | Rz (μm) | Rsm (μm) |
|---|---|---|---|---|
| R1 | R1 | 0.140 | 0.757 | 0.018 |

The resulting optical properties are summarized in Table 3 below.

TABLE 3

| Ex. | Haze (%) | Clarity (%) | Gloss (SGU) | TL (%) | a*$_{Rc}$ | b*$_{Rc}$ |
|---|---|---|---|---|---|---|
| 1 | 22-23 | 74-77 | 27 | 94 | 0.5 | −1.5 |
| 2 | 21 | 74-77 | 27 | 95 | 0.6 | 0.3 |
| R1 | 22 | 74 | 31 | 92 | −0.1 | −0.6 |

As can be seen, while most optical properties remain the same, color in reflection changes only a little and light transmission (TL) increases by 2 to 3% by reduction of light reflection.

To evaluate the different samples as glass dashboards, evaluations were performed using a virtual prototyping software 'Ocean' by the company Eclat Digital. This software provides realistic rendering based on the physical properties of the materials used and allows quantitative evaluations of optical properties in complex three dimensional environments.

The reflectance of different samples hereinabove was measured over the whole visible spectrum at different angles and the simulated results using 'Ocean' were found to be within 0.1% of the measured values.

Figure 5:
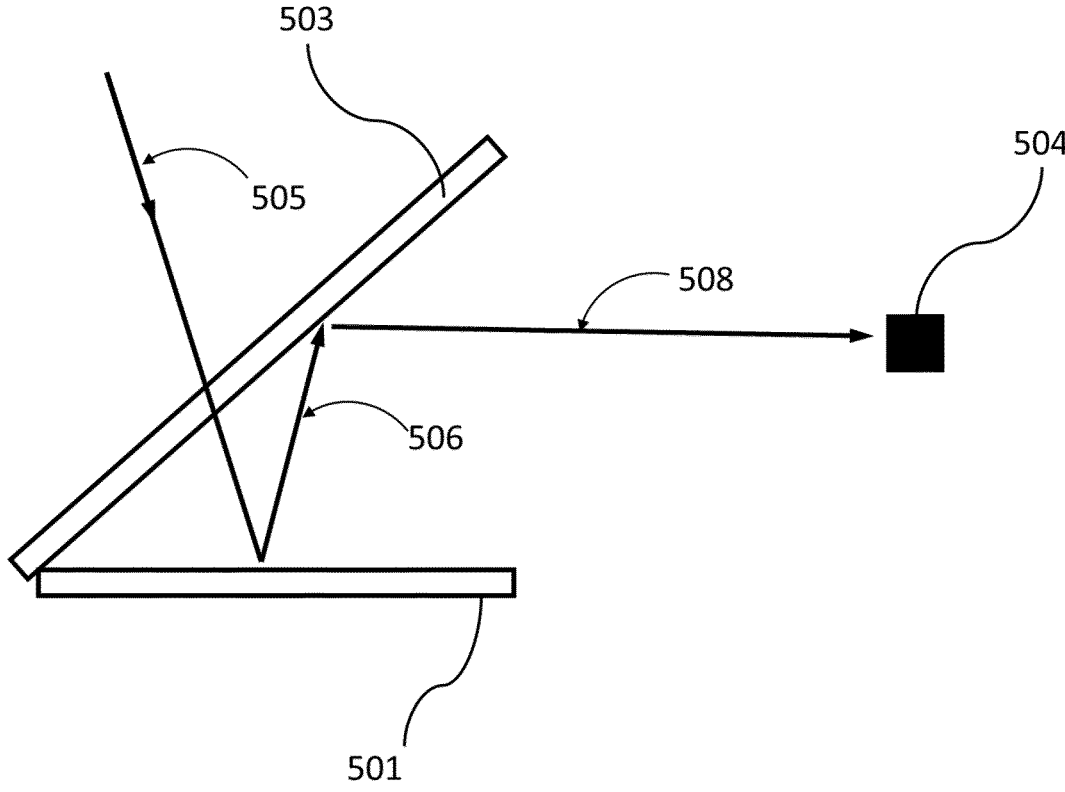
FIG. 5 is a schematic cross-sectional view of a setup to evaluate light reflected towards a driver.

A two-dimensional cross section of the evaluation setup is illustrated in FIG. 5. Light (505) from a light source strikes the first surface of a flat dashboard glass sample (501) at an angle of 20° to the surface normal of the dashboard glass sample. The first surface is either first surface that is etched and ion implanted a first surface that is etched and ion implanted of the present invention or bears a multi-layer antireflective coating; The second, opposite surface is exposed to air. The incoming light (505) is partly reflected of the first surface, partly reflected of the second surface. The combined specular reflectance of both surfaces (506) strikes the inside surface of the windshield (503) at an angle of 60° to the surface normal of the windshield and is reflected towards the intended position (504) of a driver where it is measured.

Figure 6:
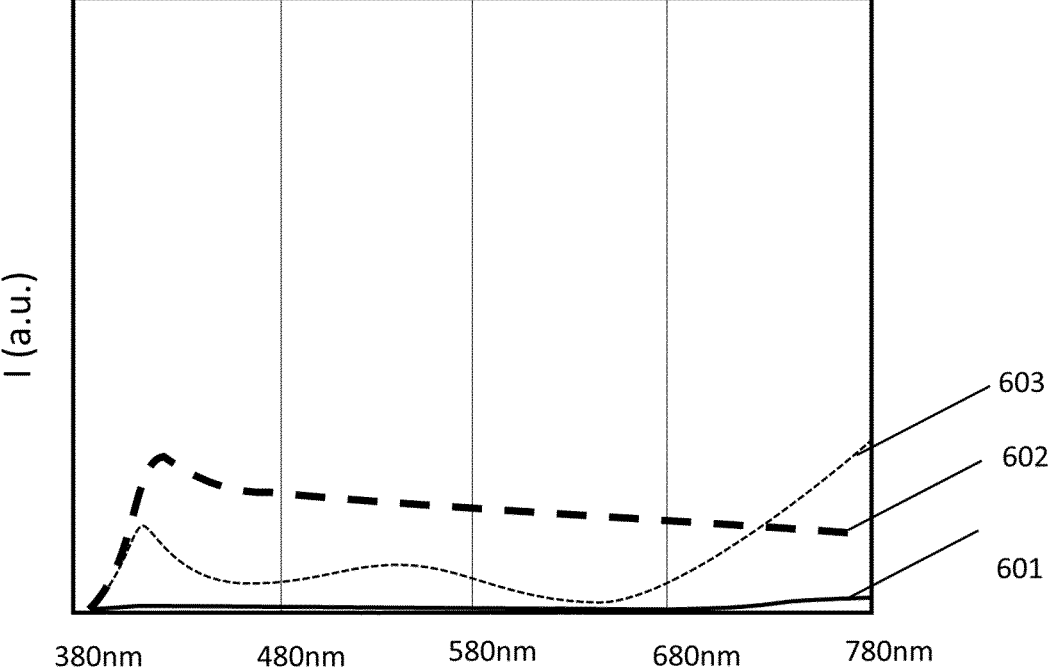
FIG. 6 is a graph comparing the amount of light reflected towards a driver for different glass dashboard parts.

In this first setup the windshield is a laminated glazing comprising, going from the outside of the vehicle towards the inside, a first glass dashboard part of a green glass of 2.1 mm thickness, a poly vinyl butyral sheet of 0.76 mm thickness, a clear glass of 1.6 mm thickness. Furthermore the incoming light (505) is close to real sunlight by using a Hosek-Wilkie environment simulating sun and the atmosphere lighting of the earth's surface. As can be seen from FIG. 6 the intensity I of the measured light at the driver position (504) is, for most of the wavelength range 410-730 nm, lowest for sample 2 (601), and highest for sample 1 (603) with sample C1 (602) in between. While the intensity curve is flat or continuously decreasing for most of the visible wavelength range for samples 1 and 2, C1 however shows a sharp increase of intensity from a wavelength of 660 nm to 780 nm. This translates in an increase of reflected light in the red wavelength range for C1 and therefore less neutral reflected light than for samples 1 and 2.

Figure 7:
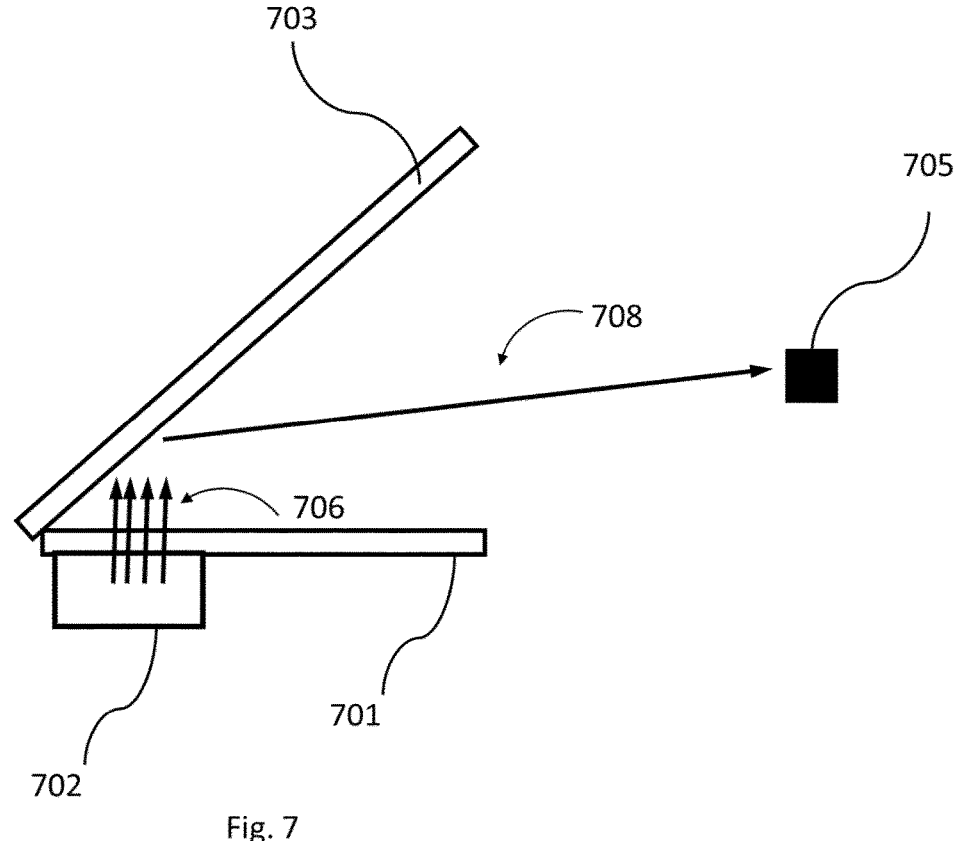
FIG. 7 is a schematic cross-sectional view of a setup to evaluate light from a head-up display source reflected towards a driver.

In a second evaluation setup shown in FIG. 7 light (706) from a head up display (HUD) light source (702), attached to the evaluated glass dashboard samples (701), traverses the samples towards the windshield (703). The surface opposite the head up display light source (702) is the etched, first surface that is etched and ion implanted or the surface provided with a multilayer antireflective coating respectively. Light (706) is reflected of windshield (703) and the amount of light reaching the driver position (705) is evaluated.

When the HUD light (706) is unpolarized, the relative amount of light reaching the driver position (705) compared to references R1 or R2 respectively (set at 100%) is 108% for C1 and sample 1, 110% for sample 2.

When the HUD light (706) is p-polarized, the relative amount of light reaching the driver position (705) compared to references R1 or R2 respectively (set at 100%), is 103% for C1 and sample 2, 106% for sample 1. In this case coating designed for reflecting p-polarized light may be deposited on the inside surface of the windshield.

Figure 8:
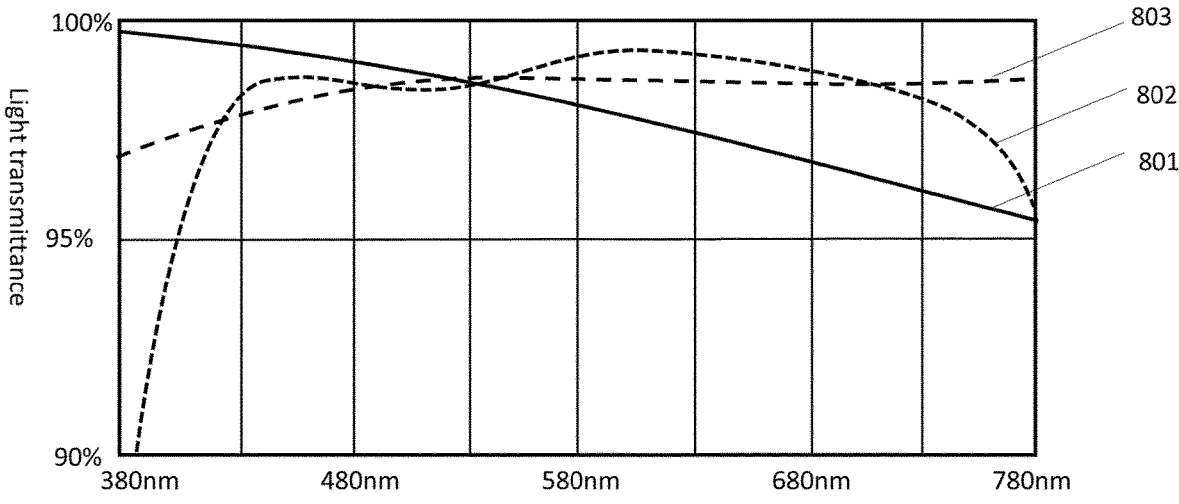
FIG. 8 is a graph comparing the amount of light transmitted through different glass dashboard parts.

Further is was found that when the HUD light (706) is p-polarized, referring to FIG. 8, the light transmittance for C1 (802) drops strongly at both ends of the visible spectrum. This situation is difficult to handle when similar luminous intensities are whished for over the whole visible spectrum. For samples 1 (803) and 2 (801) the light transmittance may not always be higher than for C1, however the difference between the maximum and minimum transmittance for these samples is less than 5% over the whole visible wavelength range.

The invention claimed is:

1. A veiling glare reduction system for a vehicle comprising:
   a windshield; and
   a dashboard,
   wherein the windshield comprises an inner surface and an outer surface;
   wherein the windshield allows light to pass therethrough,
   wherein the dashboard is a glass dashboard comprising a part that reflects the light passing through the windshield; and wherein the part of the glass dashboard comprises a first surface that faces the windshield and is etched and ion implanted.

2. The veiling glare reduction system according to claim 1, wherein the first surface of the part has a roughness such that when the roughness is measured on an evaluation length of 12 mm with a Gaussian filter using a cut-off wavelength of 0.8 mm, the following relationships are satisfied,
   $0.02 \ \mu m \le Ra \le 0.60 \ \mu m$,
   $0.1 \ \mu m \le Rz \le 3.0 \ \mu m$, and
   $0.01 \ \mu m \le RSm \le 0.08 \ \mu m$.

3. The veiling glare reduction system according to claim 1, wherein when measured from the first surface with an opposite surface exposed to air the part of the glass dashboard part has
   a haze value from 1 to 85%,
   a clarity value from 10 to 100%,
   a gloss value at 60° from 10 to 50 SGU, and
   a visible light reflectance from 7 to 4.5%.

4. The veiling glare reduction system according to claim 1, wherein implanted ions are selected from positively charged ions of O, N, He, Ne, Ar, or Kr and/or that the implanted ions are present, proximate the first surface, up to a depth from 0.1 $\mu m$ to 1 $\mu m$ and or in that an amount of implanted ions is from $5 \times 10^{14}$ ions/cm$^2$ to $10^{18}$ ions/cm$^2$.

5. The veiling glare reduction system according to claim 1, further comprising a dashboard support structure,
   wherein the part of the glass dashboard is at least partly laminated to the dashboard support structure.

6. The veiling glare reduction system according to claim 2, wherein $0.14 \ \mu m \le Ra \le 0.4 \ \mu m$, and $0.015 \ \mu m \le RSm \le 0.060 \ \mu m$.

7. The veiling glare reduction system according to claim 1, wherein when measured from the first surface with an opposite surface exposed to air the part of the glass dashboard has a haze value from 1 to 40%, a clarity value from 20 to 100%, and a gloss value at 60° from 10 to 40 SGU.

8. The veiling glare reduction system according to claim 1, wherein the part of the glass dashboard and the windshield are arranged so that light passing through the windshield and reflected off the first surface of the glass dashboard surface is partly reflected by the inner surface of the windshield towards a driver position.

9. A vehicle having a vehicle glare reduction system according to claim 1.

10. A method of reducing veiling glare in a vehicle with a windshield and a glass dashboard part, comprising:
    passing light through the windshield;
    allowing the light passing through the windshield to strike the glass dashboard part surface and be reflected by the glass dashboard part surface; and
    diffusing the light reflected by the glass dashboard part comprising a glass substrate by providing the glass substrate with a first surface that is etched and ion implanted and has a surface roughness and comprises implanted ions within a layer within the substrate and adjacent to the first substrate surface such that the light is diffusively reflected from the glass dashboard part.

11. The method according to claim 10, wherein the glass dashboard part and the windshield are arranged so that light passing through the windshield and reflected off the first surface of the glass dashboard is partly reflected by an inner surface of the windshield towards a driver position.

12. A head-up display system for a vehicle comprising a veiling-glare reduction system according to claim 1, wherein the windshield comprises a first substrate and a second substrate substantially parallel and spaced-apart, the first and second substrates sandwiching a polymer-inclusive interlayer;

further comprising an image source configured to direct light rays corresponding to an image to be formed at the windshield, the light rays being directed towards the windshield through the glass dashboard part; and wherein a second surface of the glass dashboard, opposing the first surface, faces the image source.

13. The head-up display system of claim 12, wherein the light rays directed by the image source are p-polarized.

14. The head-up display system of claim 12, wherein the windshield further comprises a low-E coating.

15. The head-up display system of claim 12, wherein the windshield comprises a coating selectively reflecting p-polarized light on at least part of a surface facing the glass dashboard part.

16. The veiling glare reduction system according to claim 1, wherein when measured from the first surface with an opposite surface exposed to air the part of the glass dashboard has a haze value from 1 to 35%, a clarity value from 40 to 80%, and a gloss value at 60° from 20 to 35 SGU.

* * * * *